(12) United States Patent
Nagasawa

(10) Patent No.: US 10,906,495 B2
(45) Date of Patent: Feb. 2, 2021

(54) PASSENGER PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 16/239,840

(22) Filed: Jan. 4, 2019

(65) Prior Publication Data

US 2019/0299903 A1 Oct. 3, 2019

(30) Foreign Application Priority Data

Mar. 30, 2018 (JP) .................................. 2018-068591

(51) Int. Cl.
*B60R 21/207* (2006.01)
*B60R 21/2338* (2011.01)
(Continued)

(52) U.S. Cl.
CPC ........ *B60R 21/207* (2013.01); *B60R 21/0132* (2013.01); *B60R 21/2338* (2013.01); *B60R 2021/0044* (2013.01); *B60R 2021/01211* (2013.01); *B60R 2021/161* (2013.01); *B60R 2021/23386* (2013.01)

(58) Field of Classification Search
CPC .............. B60R 21/207; B60R 21/2338; B60R 21/0132; B60R 2021/161; B60R 2021/01211; B60R 2021/23386; B60R 2021/0044; B60R 21/20

See application file for complete search history.

(56) References Cited

U.S. PATENT DOCUMENTS 5,575,497 A 11/1996 Suyama et al.
6,616,184 B2 * 9/2003 Fischer ................. B60R 21/205
280/735

(Continued)

FOREIGN PATENT DOCUMENTS

DE 10 2015 001 198 A1 8/2016
JP H07-329688 12/1995

(Continued)

OTHER PUBLICATIONS

Office Action for Japanese Patent Application No. 2018-068591 dated Aug. 27, 2019 (5 pages in Japanese with English Translation).

*Primary Examiner* — Darlene P Condra
(74) *Attorney, Agent, or Firm* — Smith, Gambrell & Russell, LLP

(57) ABSTRACT

A passenger protection apparatus for vehicle includes an airbag, a tether, a tension member, and a controller. The airbag is configured to deploy via a seat on which a passenger sits or a periphery member of the seat. The tether has a first end coupled to a front portion of the airbag in a deployment direction of the airbag. The tension member is coupled to a second end of the tether and configured to pull the first end to the seat side. The controller is configured to activate the tension member to pull the tether at the same time as the airbag deploys, when the airbag is deploying, or after the airbag has deployed.

20 Claims, 5 Drawing Sheets

(51) Int. Cl.
  *B60R 21/0132* (2006.01)
  *B60R 21/16* (2006.01)
  *B60R 21/01* (2006.01)
  *B60R 21/00* (2006.01)

(56) References Cited

U.S. PATENT DOCUMENTS

| | | | |
|---|---|---|---|
| 10,543,800 B2* | 1/2020 | Kwon | B60R 21/2338 |
| 2006/0131847 A1* | 6/2006 | Sato | B60R 21/23138 |
| | | | 280/730.2 |
| 2007/0024033 A1 | 2/2007 | Suzuki et al. | |
| 2009/0091109 A1* | 4/2009 | Duarte De Arez | B60R 21/239 |
| | | | 280/736 |
| 2009/0218795 A1* | 9/2009 | Fukawatase | B60R 21/2338 |
| | | | 280/736 |
| 2010/0109306 A1 | 5/2010 | Dong et al. | |
| 2011/0285115 A1* | 11/2011 | Putala | B60R 21/2338 |
| | | | 280/730.2 |
| 2018/0326938 A1* | 11/2018 | Rickenbach | B60R 21/233 |
| 2019/0111884 A1 | 4/2019 | Kobayashi et al. | |

FOREIGN PATENT DOCUMENTS

| | | |
|---|---|---|
| JP | 2006-008105 A | 1/2006 |
| JP | 2007-030791 A | 2/2007 |
| JP | 2017-019384 A | 1/2017 |
| KR | 10-2012-0043551 | 5/2016 |
| WO | 2017/199850 A1 | 11/2017 |

* cited by examiner

PASSENGER PROTECTION APPARATUS FOR VEHICLE

The present application claims priority from Japanese Patent Application No. 2018-068591 filed on Mar. 30, 2018, the entire contents of which are hereby incorporated by reference.

BACKGROUND

1. Technical Field

The present invention relates to a passenger protection apparatus for vehicle.

2. Related Art

In order to protect a passenger in a vehicle, an airbag provided in a seat near the passenger has been used. There has been known a side airbag device capable of protecting the head of a passenger including an airbag body deployed between a body side part of the vehicle and a part from the chest to the head of the passenger, and an airbag projecting member deployed to project in front of the face of the passenger from the airbag body, which is disclosed, for example, in Japanese Unexamined Patent Application Publication No. 2006-008105.

SUMMARY OF THE INVENTION

An aspect of the present invention provides a passenger protection apparatus for vehicle including: an airbag configured to deploy via a seat on which a passenger sits or a periphery member of the seat; a tether having a first end coupled to a front portion of the airbag in a deployment direction of the airbag; a tension member coupled to a second end of the tether and configured to pull the first end to the seat side; and a controller configured to activate the tension member to pull the tether at the same time as the airbag deploys, when the airbag is deploying, or after the airbag has deployed.

DETAILED DESCRIPTION

Figure 1A:
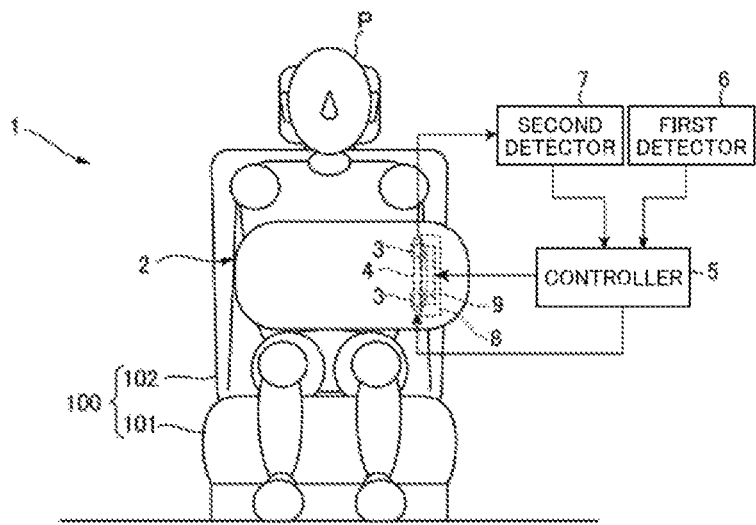
FIG. 1A is a front view schematically illustrating a passenger protection apparatus according to an example of the present invention.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description. As automated driving technology has been developing, the sitting position and posture of the passenger in the vehicle compartment will increasingly become free. In that case, the seat layout may be different from the past, and therefore it may be difficult to protect the passenger by the conventional airbag provided in a steering or an instrument panel. Accordingly, there is an increasing demand to provide a passenger protection device such as an airbag disposed in the seat. However, it is difficult for the conventional side airbag device to cope with collisions in all directions.

Figure 1B:
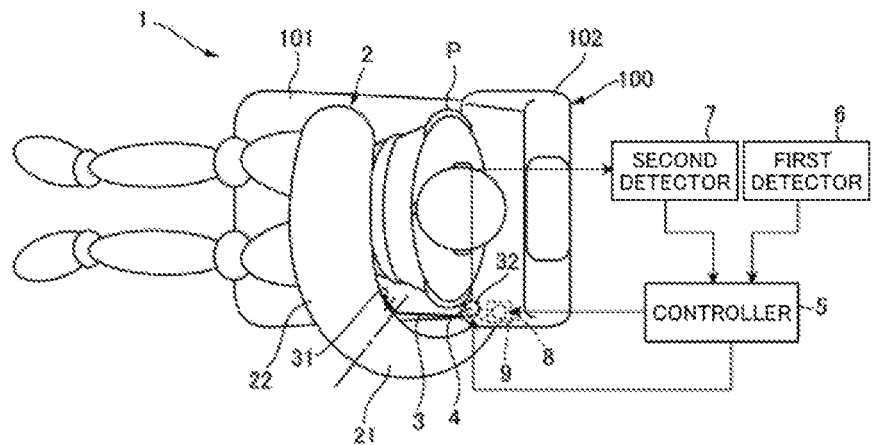
FIG. 1B is a plan view schematically illustrating the passenger protection apparatus.
Figure 2:
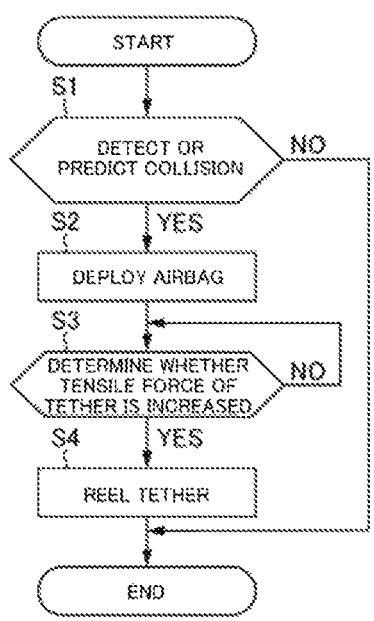
FIG. 2 is a flowchart illustrating a control process to deploy an airbag illustrated in FIGS. 1A-1B.
Figure 3A:
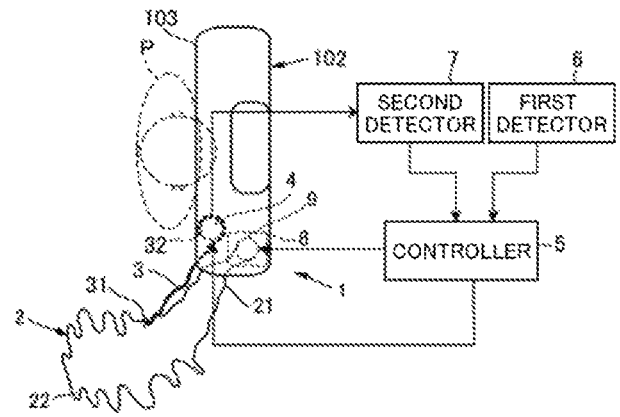
FIGS. 3A-3C illustrate the deployment of the airbag of the passenger protection apparatus illustrated in FIGS. 1A-1B.
Figure 3B:
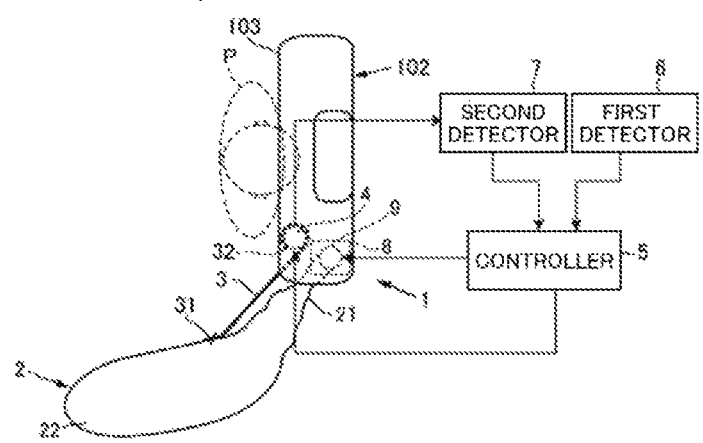
Figure 3C:
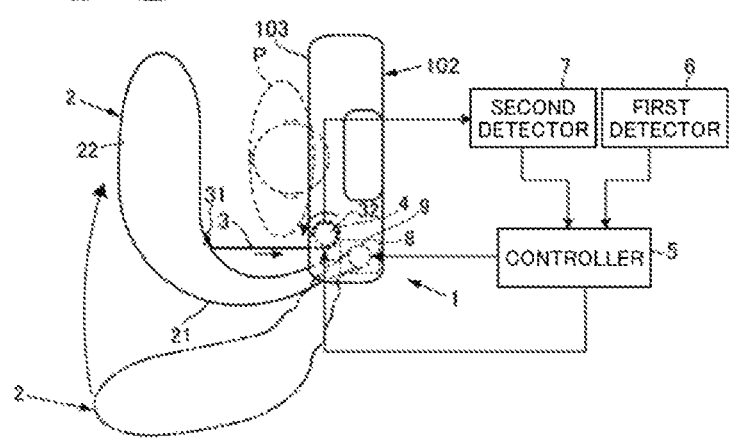

It is desirable to provide a passenger protection apparatus for vehicle capable of protecting a passenger from various types of collisions only by components of the seat on which the passenger sits. FIG. 1A is a front view schematically illustrating a passenger protection apparatus 1 according to an example of the present invention. FIG. 1B is a plan view schematically illustrating the passenger protection apparatus 1. FIG. 2 is a flow chart illustrating a control process to deploy an airbag 2 illustrated in FIG. 2. FIGS. 3A-3C illustrate the deployment of the airbag 2 of the passenger protection apparatus 1.

As illustrated in FIGS. 1A-1B, the passenger protection apparatus 1 includes the airbag 2, a tether 3, a tension member 4, and a controller 5. In addition, the passenger protection apparatus 1 includes a first detector 6 and a second detector 7 to control the passenger protection apparatus 1 by the controller 5.

The airbag 2 is deployed via the surface of a seat 100 on which a passenger P sits. As illustrated in FIG. 1B, the airbag 2 includes a base portion 21 and a front portion 22 which are parted at the coupling position of the airbag 2 to the tether 3. The base portion 21 is disposed on one side of the passenger P, and the front portion 22 is disposed in front of the passenger P. The seat 100 includes a seat cushion 101 on which the passenger P can sit, and a seat back 102 on which the passenger P can lean back. The airbag 2 is made of fabric and has a pouch-shaped body. Before the deployment, the airbag 2 is folded and stored in a storage member 8 disposed in the seat back 102. The airbag 2 is formed in a plate-like shape. In order to deploy the airbag 2, gas generated in an inflator 9 provided in the storage member 8 is injected into the airbag 2. Then, the airbag 2 expands and protrudes from the storage member 8 to break the surface of the seat back 102, and therefore to deploy in the vehicle compartment. Here, with the present example, the airbag 2 protrudes from the surface of the seat 100. However, this is by no means limiting, and the airbag 2 may protrude from an interior material as a peripheral member of the seat 100.

The tether 3 is a long member made of, for example, the same material as that of the airbag 2. The tether 3 is coupled to the outer surface of the airbag 2. To be more specific, a first end 31 of the tether 3 is coupled to the front end of the airbag 2 in the deployment direction, and a second end 32 is coupled to the tension member 4. Before the deployment of the airbag 2, the tether 3 is accommodated in the seat back 102.

The tension member 4 is disposed in the seat back 102. The tension member 4 is configured to hold the second end 32 of the tether 3 and rotationally driven by gas or electricity. The tension member 4 rotates about the axis along the vertical direction of the seat 100 to reel the tether 3, and therefore to pull the first end 31 of the tether 3 to the seat back 102 side. Here, the tension member 4 may rotate in the direction opposite to the direction in which the tether 3 is reeled to unreel the tether 3.

The first detector 6 detects or predicts a collision of the vehicle. To be more specific, the first detector 6 detects or predicts a collision of the own vehicle with another vehicle or an obstacle, based on the monitoring result of the surrounding environment of the vehicle by a camera or a sensor. The first detector 6 can output the detection result to the controller 5. The first detector 6 can determine an occurrence of a collision based on the detection of an impact on the own vehicle by, for example, an in-vehicle acceleration sensor. As for the prediction of a collision, it is possible to derive a possibility that another vehicle or an obstacle contacts the own vehicle by combining the result of monitoring another vehicle or an obstacle by an monitoring camera or sensor in the vehicle that monitors the outside of the vehicle with parameters such as the running speed and the direction of the vehicle. Moreover, it is possible to determine whether there is a high or low possibility of a collision based on whether the derived result exceeds a predetermined threshold. The first detector 6 may be realized by a combination of a processing unit to analyze the monitoring results and, for example, an in-vehicle camera, a monitoring sensor, or an acceleration sensor.

The second detector 7 with a sensor detects the tensile force of the tether 3. The second detector 7 can output the detection result to the controller 7. The sensor of the second detector 7 may be, for example, a tension sensor, and a sensor configured to detect a reel-up amount of the tether 3 (hereinafter "reel-up sensor"). The tension sensor may detect the force of the tether 3 applied to the rotation axis of the tension member 4 in the direction in which the tether 3 is unreeled, and therefore to derive the tensile force of the tether 3. Meanwhile, the reel-up sensor may detect how much the tension member 4 rotates from the origin point of the rotation axis of the tension member 4, and therefore to derive the reel-up amount or the reel-off amount of the tether 3, and calculate the tensile force of the tether 3, based on the original length and the reel-up amount of the tether 3. Here, although the tensile force of the tether 3 is detected by the second detector 7, this is by no means limiting. The tensile force of the tether 3 may be estimated, instead of the direct monitoring by using the above-described sensors. In this case, for example, an elapsed time from the start of the deployment of the airbag 2 is measured by a timer, and after a predetermined period of time has elapsed, it is possible to estimate that the airbag 2 is deployed at a predetermined degree. Here, it is preferred that the correlation between the amount of the deployment of the airbag 2 and the amount of the tether 3 drawn from the seat 100 is previously stored in a processing unit to estimate the tensile force of the tether 3. The second detector 7 may be realized by a combination of a processing unit to analyze the detected data and, for example, the above-described sensors.

The controller 5 controls the activation of the inflator 9 and the tension member 4. To be more specific, the controller 5 activates the inflator 9 based on the detection result outputted from the first detector 6, and activates the tension member 4 based on the detection result outputted from the second detector 7. The inflator 9 activated by the controller 5 ignites explosives to generate gas. The tension member 4 activated by the controller 5 rotates about the rotation axis. The controller 5 can output activating signals to the inflator 9 and the tension member 4. As the controller 5, for example, an ECU which is an in-vehicle processing unit may be used.

Next, the control process of the passenger protection apparatus 1 will be described with reference to FIG. 2, and the deployment of the airbag 2 will be described with reference to FIGS. 3A-3C.

First, the first detector 6 detects or predicts a collision of the own vehicle (step S1). In the step S1, when the first detector 6 determines that a collision occurs based on the detection result, the step moves to the next step (step S1/YES). In addition, in the step S1, upon detecting another vehicle or an obstacle approaching the own vehicle, the first detector 6 derives a risk due to the approach, and predicts a collision when the risk value exceeds a predetermined threshold. In this case, the step moves to the next step (step S1/YES). Here, when the first detector 6 determines that there is no collision based on the detection result, there is no need to prepare a collision and activate the inflator 9 and the tension member 4, and therefore the process is ended (step S1/NO). In addition, when the first detector 6 does not predict a collision because there is no vehicle or obstacle approaching the own vehicle, or when there is a low possibility of a collision because the risk value does not exceed the predetermined threshold although another vehicle or an obstacle approaches the own vehicle, the process is also ended (step S1/NO). The detection result of the first detector 6 is outputted to the controller 6.

When the first detector 6 detects or predicts a collision (step S1/YES), the controller 5 activates the inflator 9 (step S2). In the step S2, upon receiving an activation signal from the controller 5, the inflator 9 ignites explosives to generate gas. The gas generated in the inflator 9 is injected into the airbag 2 to expand the airbag 2, and the expanding airbag 2 breaks a seat surface 103 of the seat back 102 and protrudes from the seat back 102. FIG. 3A illustrates the airbag 2 protruding from the seat back 102 in an early stage of the deployment.

FIG. 3A illustrates the airbag 2 in a state where a certain amount of the gas has flowed into the base portion 21, but a little amount of the gas has flowed into the front portion. In this case, the tether 3 is loose. The airbag 2 protrudes outward in the width direction of the seat 100 (hereinafter "seat width direction"), toward the front of the seat 100.

Then, the airbag 2 is expanding as illustrated in FIG. 3B. FIG. 3B illustrates the airbag 2 in a state where a certain amount of the gas has flowed into the base portion 21, and the front portion 22 is approximately filled with the gas. At this time, the tether 3 is tensioned to make a straight line between the first end 31 coupled to the outer surface of the airbag 2 facing inward in the seat width direction and the second end 32 coupled to the tension member 4. The airbag 2 illustrated in FIG. 3B protrudes outward in the seat width direction, toward the front of the seat 100 in the same way as FIG. 3A.

After that, as the airbag 2 deploys, the first end 31 of the tether 3 coupled to the airbag 2 is pulled, so that the tensile force of the tether 3 is increased. At this time, the second detector 7 determines whether the tensile force of the tether 3 is increased (step S3) in the control process illustrated in FIG. 2. In the step S3, when the tensile force of the tether 3 detected by the second detector 7 is greater than a threshold, the second detector 7 determines that the deployment of the airbag 2 is nearly completed, and the step moves to the next step (step S3/YES). On the other hand, when the second detector 7 determines that the tensile force of the tether 3 is equal to or smaller than the threshold, the step 3 is repeatedly performed (step 3/NO). The determination result of the second detector 7 is outputted to the controller 5.

When the second detector 7 determines that the tensile force of the tether 3 is increased to a value equal to or greater than a predetermined value (step S3/YES), the controller 5 activates the tension member 4 (step S4). In the step S4, upon receiving an activation signal from the controller 5, the tension member 4 is rotated about the rotation axis. FIG. 3C illustrates the airbag 2 in a state where the tension member 4 is rotated.

The deployment of the airbag 2 progresses from the state illustrated in FIG. 3B to the state illustrated in FIG. 3C where the deployment is completed. The airbag 2 illustrated in FIG. 3C is in a state where both the base portion 21 and the front portion 22 are approximately filled with the gas. When the base portion 21 in the state illustrated in FIG. 3B is changed to the state illustrated in FIG. 3C where the base portion 21 is approximately filled with the gas, the tether 3 is reeled by the rotation of the tension member 4, so that the first end 31 of the tether 3 is pulled to the seat back 102 side. By this means, the base portion 21 is curved outward in the seat width direction. Therefore, the front portion 22 faces inward in the seat width direction. In addition, the entire airbag 2 is turned inward in the seat width direction with respect to the tension member 4 coupled to the second end 32 of the tether 3. Therefore, the front portion 22 of the airbag 2 deploys in front of the upper body of the passenger P. The airbag 2 protruding outward is turned inward in the seat width direction as illustrated in FIG. 3C, so that the deployment of the airbag 2 is completed.

As illustrated in FIG. 3A-3C, the airbag 2 protrudes from the seat back 102 at a position outside the upper body of the passenger P in the seat width direction, toward the front of the seat 100, and the front portion 22 is turned inward from the position where the airbag 2 protrudes in the seat width direction by pulling the tether 3 to the seat back side 102. As a result, the airbag 2 deploys in front of the upper body of the passenger P. With the present example, the tether 3 is coupled to the airbag 2 at the position to allow the front portion 22 to be larger than the base portion 21. By this means, it is possible to increase the area to cover the upper body of the passenger P in the seat width direction.

Accordingly, the airbag 2 protruding from the seat back 102 is deployed to cover the front and the side of the upper body of the passenger P. As a result, it is possible to protect the passenger P from various types of collisions such as a frontal collision, a lateral collision, a rear collision, and an oblique collision only by the components of the seat 100.

If the airbag 2 is pulled by the tether 3 since the early stage of the deployment, the airbag 2 may move in various directions near the passenger P. In contrast, as illustrated in FIGS. 3A-3C, the airbag 2 is deployed outward in the seat width direction, toward the front of the seat 100 but never faces the passenger P until the final stage of the deployment. It is because the length of the tether 3 is set to tension the tether 3 after the airbag 2 is sufficiently extended forward at least in front of the passenger P. By this means, it is possible to prevent the airbag 2 from curving or bending to approach the passenger P by pulling the tether 3 until the final stage of the deployment of the airbag 2, that is, until the vigorous motion of the expanding front portion 22 of the airbag 2 in various directions nearly ends. Therefore, it is possible to reduce the risk of hitting the passenger P against the airbag 2.

Moreover, with the example illustrated in FIGS. 1A-1B to 3A-3C, the tension member 4 is disposed outside the upper body of the passenger P in the seat width direction, and after the deployment of the airbag 2 is completed, the first end 31 of the tether 3 is located outside of the upper body of the passenger P in the seat width direction. By this means, it is possible to prevent the tether 3 from contacting the upper body of the passenger P. Here, since the tether 3 is not allowed to contact the upper body of the passenger P, it is possible to prevent the first end 31 of the tether 3 from facing outward in the seat width direction. In other words, the tether 3 tends to be parallel to the front-rear direction of the seat 100, or the first end 31 of the tether 3 tends to face inward in the seat width direction. In a case where the tether 3 is in this state when the deployment of the airbag 2 is completed, the expanded front portion 22 comes closer to the passenger P, and therefore it is possible to improve the passenger protection performance of the airbag 2 near the passenger P.

With the example illustrated in FIGS. 1A-1B, and 3A-3C, the tension member 4 is activated during the deployment of the airbag 2. However, this is by no means limiting, and the tension member 4 may be activated at the same time as the airbag 2 deploys, or after the airbag 2 has deployed. In a case where a period of time until a collision of the vehicle is short, or in a case of a lateral collision where a period of time to protect the passenger P is short, it is preferred to activate the tension member 4 and deploy the airbag 2 at the same time. In that case, the controller 5 may output an activation signal to the tension member 4 at the same time as the inflator 9 is activated. Moreover, in order to stably deploy the airbag 2, it is preferred to activate the tension member 4 after the deployment of the airbag 2 is completed. In that case, the controller 6 may output an activation signal to the tension member 4 when a period of time until the completion of the deployment which is measured by a timer and stored in advance has elapsed.

With the present example, the airbag 2 may protrude toward the lower body of the passenger P from the seat cushion 101 at a position outside the passenger P in the seat width direction, and then the front portion 22 of the airbag 2 is turned inward in the seat width direction by the tether 3 to deploy above the lower body of the passenger P. In this case, it is preferred that the tether 3 is pulled by the tension member 4 at the same time as the airbag 2 deploys, when the airbag 2 is deploying, or after the airbag 2 has deployed, and the front portion 22 of the airbag 2 is larger than the base portion 21. By this means, it is possible to cover the lower body of the passenger P from above in the seat width direction.

Thus, the airbag 2 protruding from the seat cushion 101 covers the upper part and the side part of the lower body of the passenger P, and therefore it is possible to protect the lower body of the passenger P from various types of collisions, such as a frontal collision, a lateral collision, a rear collision, and an oblique collision only by the components of the seat 100.

Moreover, it is preferred that the tension member 4 and the first end 31 of the tether 3 are located outside the lower body of the passenger P in the seat width direction after the deployment of the airbag 2 is completed. By this means, it is possible to more effectively prevent the tether 3 from contacting the lower body of the passenger P, and therefore to make the expanded front portion 22 of the airbag 2 closer to the passenger P. As a result, it is possible to improve the protection performance of the airbag 2 near the passenger P.

Figure 4:
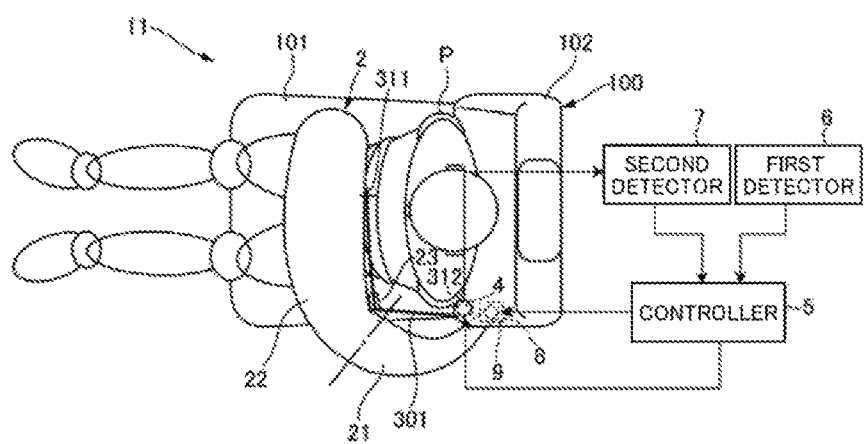
FIG. 4 is a plan view schematically illustrating a passenger protection apparatus according to another example of the present invention.
Figure 5:
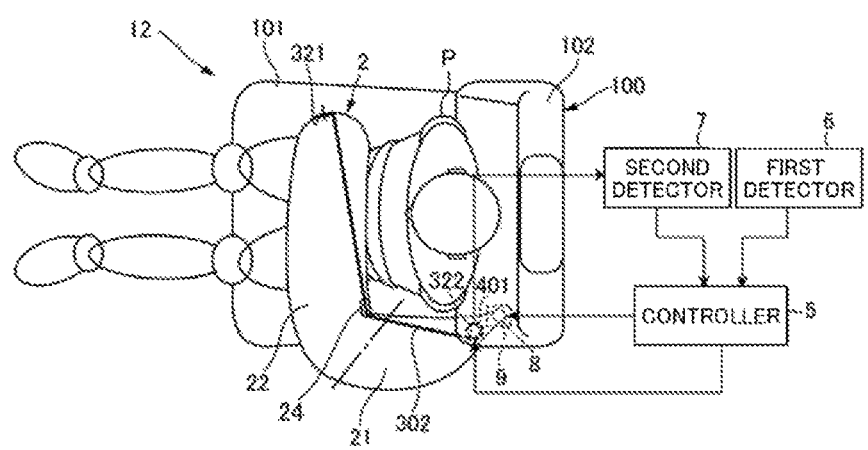
FIG. 5 is a plan view schematically illustrating a passenger protection apparatus according to another example of the present invention.

Next, modifications of the passenger protection apparatus according to the present invention will be described with reference to FIGS. 4 and 5. FIG. 4 is a plan view schematically illustrating a passenger protection apparatus 11 according to another example of the present invention. FIG. 5 is a plan view schematically illustrating a passenger protection apparatus 12 according to another example of the present invention. Hereinafter, the same components as those in FIGS. 1A-1B and FIGS. 3A-3C are assigned with the same reference numerals, and redundant description is omitted.

The passenger protection apparatus 11 illustrated in FIG. 4 is different from the passenger protection apparatus 1 in a guide member 23. The guide member 23 is fixed to the outer surface of the airbag 2 at a position where the distance between the guide member 23 and the seat back 102 is shorter than the distance between the coupling position of the airbag 2 to a first end 311 of a tether 301 and the seat back 102. The guide member 23 is an annular member made of, for example, the same material as that of the airbag 2, and is configured to be able to pass the tether 301 therethrough.

In the passenger protection apparatus 11, part of the tether 301 from the first end 311 fixed to the airbag 2 to a second end 312 held by the tension member 4 is disposed through the guide member 23. The route of the tether 301 is changed by the guide member 23. The tether 301 is not fixed to, but slides on the guide member 23.

FIG. 4 illustrates the state where the airbag 2 is completely deployed. When the passenger protection apparatus 11 is activated, the tether 301 is pulled by the tension member 4 to the seat back 102 side at the same time as the airbag 2 deploys, when the airbag 2 is deploying, or after the airbag 2 has deployed. In this case, the airbag 2 is bent from the position of the guide member 23. Here, with the present example, when the airbag 2 is curved by pulling the tether 301, the distance between the airbag 2 and the seat 100 (the seat back 102) is maximized at the position of the guide member 23. That is, the airbag 2 is deformed from the guide member 23. Therefore, the guide member 23 can adjust the shape of the airbag 2 completely deployed, and the length of the deployed airbag 2 in the front-rear direction of the vehicle and the seat width direction.

The passenger protection apparatus 12 illustrated in FIG. 5 is different from the passenger protection apparatus 1 in a guide member 24 and the arrangement of a tether 302 and a tension member 401. As illustrated in FIG. 5, the tether 302 and the tension member 401 are disposed in the airbag 2. The tether 302 is coupled to the inner surface of the airbag 2, and the tension member 401 is disposed in the airbag 2 in the seat back 102. The tension member 401 is disposed at the position different from that of the tension member 4, but made of the same material as that of the tension member 4. The tension member 401 is controlled in the same way as the tension member 4. The guide member 24 is fixed to the inner surface of the airbag 2 at a position where the distance between the guide member 24 and the seat back 102 is shorter than the distance between the coupling position of the airbag 2 to a first end 321 of the tether 302 and the seat back 102. The guide member 24 is an annular member made of, for example, the same material as that of the airbag 2, and is configured to be able to pass the tether 302 therethrough.

In the passenger protection apparatus 12, part of the tether 302 from the first end 321 fixed to the airbag 2 to a second end 322 held by the tension member 401 is disposed through the guide member 24. The route of the tether 302 is changed by the guide member 24. The tether 302 is not fixed to, but slides on the guide member 24.

FIG. 5 illustrates the state where the airbag 2 is completely deployed. When the passenger protection apparatus 12 is activated, the tether 302 is pulled by the tension member 401 to the seat back 102 side at the same time as the airbag 2 deploys, when the airbag 2 is deploying, or after the airbag 2 has deployed. In this case, the airbag 2 is bent from the position of the guide member 24. Here, with the present example, when the airbag 2 is curved by pulling the tether 302, the distance between the airbag 2 and the seat 100 (the seat back 102) is maximized at the position of the guide member 24. That is, the airbag 2 is deformed from the guide member 24. Therefore, the guide member 24 can adjust the shape of the airbag 2 completely deployed, and the length of the deployed airbag 2 in the front-rear direction of the vehicle and the seat width direction.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger protection apparatus for a vehicle comprising:
   an airbag disposed on a side of a seat back of a seat on which a passenger sits and configured to deploy outward in the seat width direction and toward a front of the seat;
   a tether having a first end coupled to a portion of the airbag deployed, the portion being, from the seat back on which the airbag is disposed, at a length less than a length of the airbag deployed in a deployment direction;
   a tension member which is disposed at a position where the airbag is disposed and which is coupled to a second end of the tether, and the tension member being configured to pull the first end to the seat side; and
   a controller configured to:
      determine whether deployment of the airbag is approximately completed by determining a tension state of the tension member, and
      activate the tension member to reel the tether when the controller determines that deployment of the airbag is approximately completed.

2. The passenger protection apparatus for a vehicle according to claim 1, wherein:
   the airbag deploys via a surface of the seat;
   the airbag protrudes from a seat back at a protrusion position outside an upper body of the passenger in a seat width direction, toward a front of the seat; and
   the front portion of the airbag is turned inward from the protrusion position in the seat width direction to deploy in front of the upper body of the passenger.

3. The passenger protection apparatus for a vehicle according to claim 2, further comprising a guide member provided on an inner surface or an outer surface of the airbag at a position where a distance between the guide member and a seat is shorter than a distance between a coupling position of the airbag to the tether and the seat,
   wherein part of the tether from the first end to the other end is disposed through the guide member.

4. The passenger protection apparatus for a vehicle according to claim 3, wherein the first end is coupled to an outer surface of the airbag.

5. The passenger protection apparatus for a vehicle according to claim 2, wherein the first end is coupled to an outer surface of the airbag.

6. The passenger protection apparatus for a vehicle according to claim 2, wherein the first end is coupled to an inner surface of the airbag.

7. The passenger protection apparatus for a vehicle according to claim 1, wherein:
the airbag deploys via a surface of the seat;
the airbag protrudes upward from a seat cushion at a position outside a lower body of the passenger in a seat width direction; and
the front portion of the airbag is turned inward from the protrusion position in the seat width direction to deploy above the lower body of the passenger.

8. The passenger protection apparatus for a vehicle according to claim 7, further comprising a guide member provided on an inner surface or an outer surface of the airbag at a position where a distance between the guide member and a seat is shorter than a distance between a coupling position of the airbag to the tether and the seat,
wherein part of the tether from the first end to the other end is disposed through the guide member.

9. The passenger protection apparatus for a vehicle according to claim 8, wherein the first end is coupled to an outer surface of the airbag.

10. The passenger protection apparatus for a vehicle according to claim 7, wherein the first end is coupled to an outer surface of the airbag.

11. The passenger protection apparatus for a vehicle according to claim 7, wherein the first end is coupled to an inner surface of the airbag.

12. The passenger protection apparatus for a vehicle according to claim 1, further comprising a guide member provided on an inner surface or an outer surface of the airbag at a position where a distance between the guide member and a seat is shorter than a distance between a coupling position of the airbag to the tether and the seat,
wherein part of the tether from the first end to the other end is disposed through the guide member.

13. The passenger protection apparatus for a vehicle according to claim 12, wherein the first end is coupled to an outer surface of the airbag.

14. The passenger protection apparatus for a vehicle according to claim 12, wherein the first end is coupled to an inner surface of the airbag.

15. The passenger protection apparatus for a vehicle according to claim 1, wherein the first end is coupled to an outer surface of the airbag.

16. The passenger protection apparatus for a vehicle according to claim 1, wherein the first end is coupled to an inner surface of the airbag.

17. A passenger protection apparatus for a vehicle comprising:
an airbag disposed on a side of a seat back of a seat on which a passenger sits and configured to deploy out from the side of the seat back in an oblique direction that is a combination of outward in the seat width direction and toward a front of the seat;
a tether having a first end coupled to a border location of the airbag located between a front portion of the airbag and a base portion of the airbag, the border location being located such that the front portion forms larger than the base portion upon full deployment of the airbag, the tether having a second end that is coupled to the seat back, the tether further being attached to the seat back as to extend in said oblique direction during airbag deployment such that said tether becomes taut along said oblique direction;
a tension member coupled to a second end of the tether and configured to pull the first end of the tether in a direction toward the seat side when activated; and
a controller configured to:
determine whether a predetermined tension state of the tether is reached after sufficient deployment of the airbag as to render the tether taut along said oblique direction, and
activate the tension member to lessen the tether extension length and draw the front portion of the airbag across the front region of the passenger when the controller determines deployment of the airbag along said oblique direction is sufficient for the tether to reach the predetermined tension state.

18. The passenger protection apparatus for a vehicle according to claim 17, wherein activation of the tension member involves reeling in the tether and occurs upon the airbag reaching a final stage of airbag deployment wherein the airbag configuration is such that the airbag is sufficiently deployed as to extend forward of a front region of the passenger.

19. The passenger protection apparatus for a vehicle according to claim 17, wherein the airbag is configured to cover the lower, front body of the passenger and has an uppermost end configured to be below the head of the passenger.

20. The passenger protection apparatus for a vehicle according to claim 17, wherein the tether is configured such that the first end of the tether remains outward of an adjacent most side of the passenger at all times during an entire, full deployment of the airbag.

* * * * *